United States Patent [19]
Iwata et al.

[11] Patent Number: 5,554,429
[45] Date of Patent: Sep. 10, 1996

[54] WOOD BOARD AND FLOORING MATERIAL

[75] Inventors: Ritsuo Iwata; Hirotosi Takahashi; Satoshi Suzuki; Takayuki Endo, all of Hamamatsu, Japan

[73] Assignee: Yamaha Corporation, Japan

[21] Appl. No.: 274,969

[22] Filed: Jul. 14, 1994

[30] Foreign Application Priority Data

| Jul. 14, 1993 | [JP] | Japan | 5-174564 |
| Jul. 29, 1993 | [JP] | Japan | 5-188526 |
| Jul. 29, 1993 | [JP] | Japan | 5-188527 |
| Nov. 9, 1993 | [JP] | Japan | 5-279910 |
| Nov. 24, 1993 | [JP] | Japan | 5-293716 |
| Nov. 24, 1993 | [JP] | Japan | 5-293717 |
| Dec. 8, 1993 | [JP] | Japan | 5-308406 |

[51] Int. Cl.$^6$ ........................ B32B 9/00
[52] U.S. Cl. ................. 428/105; 428/106; 428/107; 428/108; 428/109; 428/111; 428/114; 428/212; 428/218; 428/246; 428/248; 428/249; 428/290; 428/302; 428/317.1; 428/402.24; 428/537.1; 52/309.9; 52/309.11
[58] Field of Search ......................... 428/105, 106, 428/107, 108, 109, 111, 114, 212, 402.24, 218, 537.1, 246, 248, 249, 290, 302, 317.1; 52/309.9, 309.8, 309.11

[56] References Cited

U.S. PATENT DOCUMENTS

| 3,164,511 | 1/1965 | Elmendorf | 161/57 |
| 4,364,984 | 12/1982 | Wentworth | 428/106 |
| 5,373,674 | 12/1994 | Winter, IV | 52/309.9 |

OTHER PUBLICATIONS

*Taschenbuch der Spanplatten technik*, DRW–Verlag Weinbrenner GmbH & Co. (1991), p. 383.
FPLE 342 OSB Resins, Forestry Department Alberta Research Council (1991).
*Polyurethane (PUR) and Isocyanates as Binders*, Beyer Co., Polyurethane Handbook (1985), pp. 563–568 and 576.

Primary Examiner—Patrick Ryan
Assistant Examiner—Abraham Bahta
Attorney, Agent, or Firm—Ostrolenk, Faber, Gerb & Soffen, LLP

[57] ABSTRACT

A wood board comprising a core layer comprising one or more strand boards formed by using a foaming binder, and at least one surface layer comprising oriented strand board, which is laminated to at least one surface of the core layer, the foaming binder being a mixture of a foaming resin and a non-foaming resin at a ratio within a range of 4:1–1:4. It is preferable that the thin wooden strips comprising the surface layer has at least one of an average length value and an average width value thereof which is larger than that of the thin wooden strips comprising the core layer. The wood board of the present invention has particularly superior resistance to moisture, and has low density and high strength. In the wood board of the present invention, it is possible to adjust the anisotropy of the strength thereof by adjusting the number of layers or the thickness thereof. The present invention furthermore provides a flooring material having high strength in which a decorative single sheet is applied to at least one surface of the wood board described above.

29 Claims, 5 Drawing Sheets

WOOD BOARD AND FLOORING MATERIAL

BACKGROUND OF THE INVENTION

1. Field of the Invention

The present invention relates to a wood board, and in particular relates to a wood board which is formed by layering a plurality of oriented strand boards which are formed from thin wooden strips adhered to one another using a binder and integrally molded.

2. Background Art

In recent years, the insufficiency of lumber resources and the protection of the forests have become problems, and it has become clear that it will be increasingly difficult to obtain timber from forests. Accordingly, the supply of plywood which is formed by adhering a plurality of veneer single sheets or the like to one another and thus layering these sheets, and which employs a large amount of raw material lumber, will be unstable, or will be insufficient, and in accordance with this, the supply of flooring materials or the like which employ such conventional plywood will be insufficient, or the material cost thereof will be very high, and thus it is expected that the production thereof will be difficult.

Figure 11:
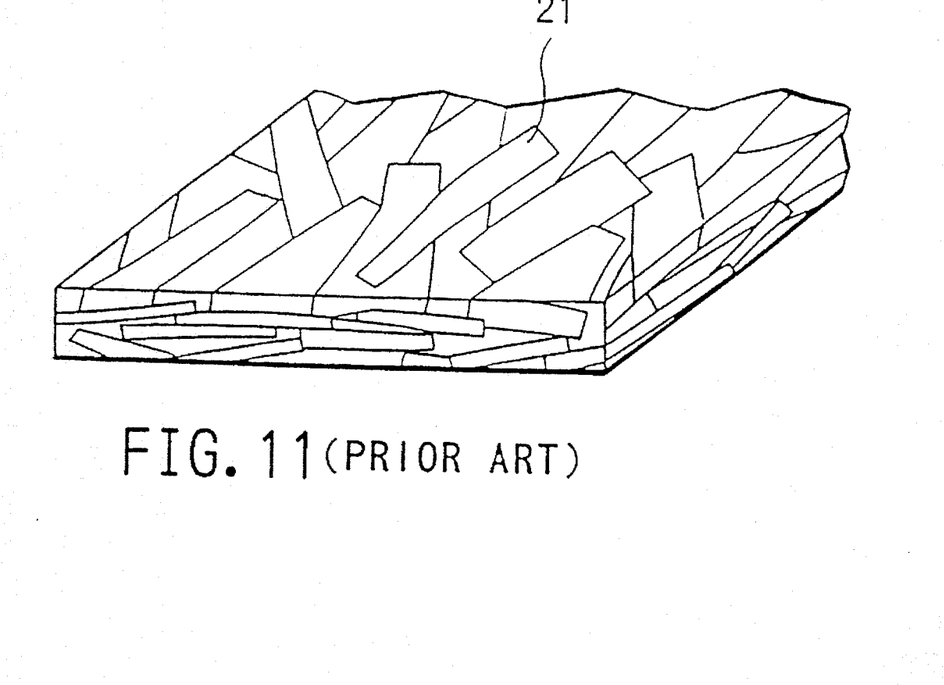
FIG. 11 shows a conventional oriented strand board.

Wood boards which can be obtained using thin wooden strips, or ligneous fibers or the like of wooden strips, which were conventionally regarded as waste materials, have attracted attention, and the application of such boards to areas in which conventional plywood was employed is expected. As shown in FIG. 11, such wood board is termed "oriented strand board", and such board is commonly formed by adhering structural elements such as thin wooden strips or the like to one another using a binder and then integrally molding this board. Accordingly, it is a relatively simple matter to obtain materials having desired dimensions or shapes by altering the molds used for molding, and by conducting molding after modifying the structural elements or adding additives, it is possible to increase resistance to insects, resistance to rotting, and flame-retardant qualities, and thus to provide characteristics which are not present in natural lumber.

However, such wood boards have low strength in comparison with natural lumber, and furthermore, while natural lumber has gaps such as pores and the like therewithin, in wood boards, the periphery of the structural elements is surrounded by non-foaming binder, and thus the density of such wood boards tends to be high. Moreover, when such wood boards are made thicker in order to increase the strength thereof, the weight thereof increases, as such boards have high densities, and this causes a problem in that such boards become difficult to handle.

As a result, attempts have been made to reduce the density of such wood boards while maintaining the strength thereof, and to provide flexibility, by integrally molding thin wooden strips or the like using a foaming binder, and thus generating very small air spaces within the board.

Figure 12:
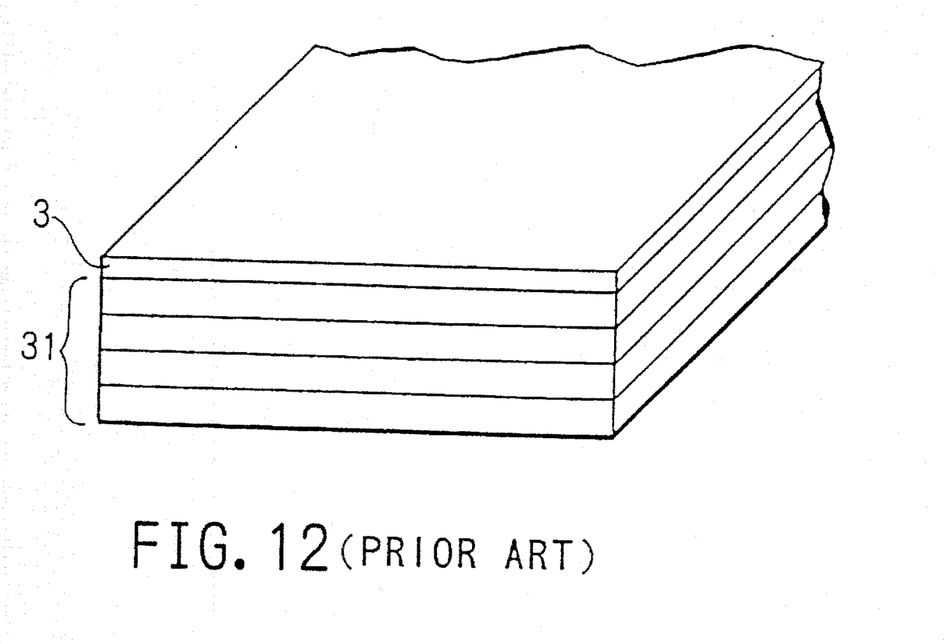
FIG. 12 shows a conventional flooring material.

Flooring material such as that shown in FIG. 12, which is formed by adhering a decorative single sheet 3 to one surface of plywood 31, is commonly used. The plywood which serves as the raw material for such flooring material is formed by adhering and layering a plurality of veneer single sheets or the like so that the grain directions thereof are alternately perpendicular; such plywood possesses sufficient strength and rigidity for use as flooring material, and the surface thereof is furthermore smooth.

Accordingly, in order to employ the wood boards described above in flooring material applications in place of such plywood, it was necessary to provide such wood boards with strength, rigidity, and surface smoothness which was equal to or superior to that of such plywood.

However, "fiber boards", for example, which employ ligneous fibers obtained by the decomposition of lumber as structural elements, have uniform and smooth surfaces; however, the strength thereof is insufficient for use as flooring material, and when such fiber boards are made thicker in order to increase the strength thereof, the density thereof becomes high, so that the weight thereof increases, and such boards become difficult to handle. Furthermore, wood boards which employ thin wooden strips as structural elements, and in particular, oriented strand boards such as that shown in FIG. 11, in which thin wooden strips 21 are arranged in essentially a single direction, are caused to adhere using a binder, and are integrally molded, have strength greater than that of the fiber boards described above. However, conventional oriented strand boards, which employed small thin wooden strips, possessed insufficient strength, and were not appropriate for use as flooring materials, and furthermore, in such oriented strand boards, numerous small thin wooden strips and the gaps therebetween were exposed at the surface of the board, and it was thus difficult to obtain a continuously smooth surface.

In these oriented strand boards, the grain direction of the thin wooden strips was arranged so as to be essentially in a single direction, so that the strength in this direction of orientation was great; however, such boards possessed problems in that the tensile and flexural strengths in a direction perpendicular to the direction of orientation were fairly low. Furthermore, the compressive strength of such oriented strand boards was great; however, as there was a problem with surface smoothness, the boards obtained by applying a decorative single sheet to the surface or applying a foundation material and a decorative single sheet to this surface exhibited a tendency to develop warping or twisting.

Furthermore, in conventional wood boards, the thin wooden strips or the like were integrally molded using a resin of non-foaming binder; however, when the amount of binder was reduced in order to decrease the density, the strength of the wood board which was obtained further declined, and on the other hand, when the amount of binder was increased, the density increased, and there was a problem in that the wooden appearance of the board was lost.

Wood boards in which thin wooden strips are integrally molded using a foaming binder in order to reduce the pressing time of the thermal compression press, and which are thus provided with air spaces therewithin as a result of the foaming of the foaming binder, possess a sufficient reduction in specific gravity; however, the increase in strength thereof is insufficient.

Furthermore, such wood boards possess a problem with moisture resistance in comparison with plywood or the like, and are inappropriate for use under conditions of high humidity. Specifically, such boards possess the problem of absorbing moisture and swelling, so that the weight thereof increases dramatically.

Accordingly, it is an object of the present invention to provide a wood board comprising an oriented strand board in which thin wooden strips are integrally molded using a binder, which board possesses high resistance to moisture.

It is a further object of the present invention to provide a wood board comprising an oriented strand board in which thin wooden strips are integrally molded using a binder, which board possesses sufficient strength and rigidity, the surfaces of which are smooth, and which has low density.

It is a further object of the present invention to provide a wood board possessing strength which is uniform in all directions.

Furthermore, it is a further object of the present invention to provide a flooring material of superior quality which employs the wood boards described above.

SUMMARY OF THE INVENTION

The wood board in accordance with the present invention comprises a core layer, comprising at least one strand board in which thin wooden strips are adhered and integrally molded using a foaming binder, and surface layers, comprising oriented strand boards in which thin wooden strips are adhered and integrally molded using a binder, laminated to at least one surface of the core layer; the foaming binder is characterized in comprising a mixture of foaming resin and non-foaming resin in a ratio within a range of 4:1–1:4.

In the wood board in accordance with the present invention, it is preferable that the surface layers which are laminated to at least one surface of the core layer comprise oriented strand boards in which thin wooden strips are adhered and integrally molded using a non-foaming binder.

Furthermore, in the wood board in accordance with the present invention, it is preferable that the average value of at least one of the length and width of the thin wooden strips comprising the surface layer be greater than that of the thin wooden strips comprising the core layer.

In addition, in the wood board in accordance with the present invention, it is preferable that both the core and surface layers comprise oriented strand boards and the directions of orientation of the thin wooden strips comprising the oriented strand boards in each adjacent layer be perpendicular to one another. Furthermore, in this wood board, it is preferable that the anisotropy of the strength of the wood board be adjusted by means of setting the number of oriented strand boards which are laminated to an odd number of 3 or more, and by varying the thickness ratio of both surface layers and the core layer. In greater detail, it is preferable that the sum of the thicknesses of the surface layers be greater than the sum of the thickness of the core layer, and that the strength in the direction of orientation of the thin wooden strips comprising the surface layers be greater than the strength in the direction of orientation of the core layer.

The present invention also provides a flooring material, in which a decorative single sheet, or a foundation material and a decorative single sheet, are applied to at least one surface of the wood board described above.

In the wood board in accordance with the present invention, a core layer comprising at least one strand board in which thin wooden strips are integrally molded using a foaming binder, and on both surfaces thereof, surface layers comprising oriented strand boards in which thin wooden strips are integrally molded using a binder, are laminated, the foaming binder comprises a mixture of foaming resin and non-foaming resin at specified ratios, and the amount of binder contained is within prespecified ranges, so that it is possible to obtain a wood board having particularly superior moisture resistance, low density, and high strength.

Furthermore, wood boards which employ non-foaming binders in the surface layers thereof have improved releasability from the mold, and thus the manufacturing efficiency thereof is improved.

Furthermore, in the wood board in accordance with the present invention, at least one of the average values of the length and width of the thin wooden strips comprising the surface layers is greater than that of the thin wooden strips comprising the core layer, and thereby, the strength is further increased, and the overall surface uniformity of the wood board is improved.

Accordingly, the flooring material which is formed by adhering a decorative single sheet to the surface of this wood board has rigidity, flexural strength, and deflection which surpass those of the flooring material using conventional plywood, and is thus sufficiently applicable as flooring material.

In the wood board in accordance with the present invention, if the oriented strand boards are laminated so that the directions of orientations in adjacent layers are mutually perpendicular, the strength in all surface directions is made uniform, and bending and warping are reduced. Furthermore, if the number of boards laminated is set to an odd number of 3 or more, and the strength in the direction of orientation of the surface layer of the wood board is adjusted by means of the thickness ratio of both surface layers and the core layer, then a wood board can be obtained which possesses optimal flexural strength in the longitudinal direction thereof.

Accordingly, if a flooring material is produced using this wood board, a floor which is smooth and which has an appropriate resiliency for walking can be obtained. Furthermore, if the structure of the layers of this laminated wood board is made non-symmetrical in the direction of thickness thereof, then it is possible to obtain a floor board which is free from bending, warping, and twisting.

In accordance with the wood board and the flooring material of the present invention, it is possible to make effective use of raw materials which were conventionally regarded as waste materials, and to conserve lumber resources. Furthermore, such raw materials have low costs, and thus it is possible to reduce raw material costs.

DETAILED DESCRIPTION OF THE INVENTION

Hereinbelow, the wood board and the flooring material in accordance with the present invention will be explained in detail.

Figure 1:
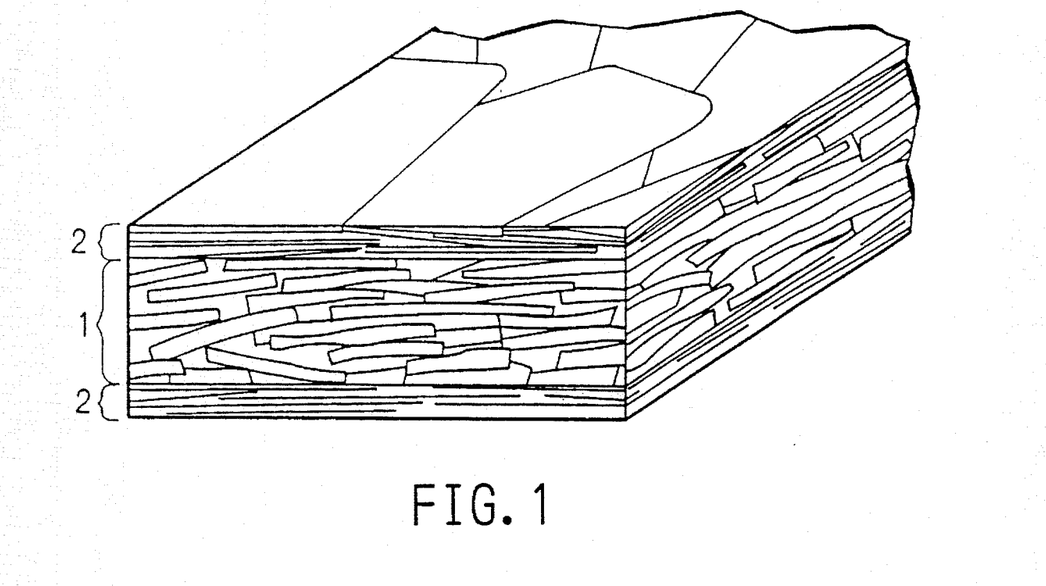
FIG. 1 is a perspective view showing an example of the wood board in accordance with the present invention.

FIG. 1 shows an example of a wood board in accordance with the present invention; in the Figure, this board has a three-layer laminated structure comprising a core layer 1 comprising one strand board and two surface layers 2 comprising oriented strand boards which are laminated to both sides of this core layer 1.

Here, what is meant by a "strand board" is a wood board in which thin wooden strips are arranged randomly and are adhered and integrally molded using a binder, and what is meant by an "oriented strand board" is a wood board in which the grain direction of the thin wooden strips is arranged so as to be in a single direction, these strips are adhered and integrally molded. Here, it is not necessary that all the thin wooden strips comprising the oriented strand board be arranged in a single direction; it is sufficient if approximately 70% of the grain directions of the thin wooden strips are arranged in a single direction.

The core layer 1 of the wood board of the present invention comprises a strand board in which thin wooden strips are adhered and integrally molded using a foaming binder. The foaming binder with is employed herein binds the thin wooden strips in core layer 1 to one another, and is itself foaming, so that it is preferable that the resin component be present solely at the intersection points between thin wooden strips, and that the small gaps between thin wooden strips be increased by means of foam cells, so that thereby, the amount of resin which is employed can be reduced, and the density of the directional oriented strand board is reduced. In the present specification, a binder which possesses the property of foaming is termed a "foaming binder", while a foaming binder which has foamed is termed a "foamed binder".

This type of foaming binder may comprise self-foaming resin, or may comprise a non-foaming resin and a foaming agent. Self-foaming resin has unsaturated isocyanate to be formed into foam polyurethane resin and the like. Unsaturated isocyanate reacts with water squeezed from constituent strands during hot press process for integration, thereby generate carbon dioxide to form urethane foam. (As a result, volume of resin becomes twenty to thirty times.)

It is preferable that the foaming binder which is employed in the present invention comprise a mixture of a foaming resin and a non-foaming resin. The mixing ratio thereof can be appropriately adjusted in accordance with the density or the like of the wood board which is desired; however, the mixing ratio of the foaming resin and the non-foaming resin should be within a range of 1:4 - 4:1. If the amount of forming resin contained is less than or equal to ⅕ or greater than or equal to ⅘, there is a tendency for the moisture resistance of the wood board which is obtained to decline.

Here, the foaming resin described above may comprise a self-foaming resin, or may comprise a mixture of a non-foaming resin and a foaming agent. Examples of self-foaming resins include foaming polyurethane resin. Examples of non-foaming resins which foamed by a foaming agent include polyurethane resin, polystyrene resin, epoxy resin, polyvinyl chloride resin, phenol resin, urea resin, and mixtures thereof. Furthermore, examples of foaming agents include, for example, volatile foaming agents such as $CCl_3F$, $CCl_2F_2$, $CCl_2F-ClF_2$, or the like, or pyrolytic foaming agents, such as, for example, azodicarbon amide, azohexahydrobenzonitrile, 2,2'-azoisobutylonitrile, benzene sulfohydrazide, N,N'-dinitroso-N,N'-dimethyl terephthal amide, or the like. The temperature of non-foaming resin and foaming agent is raised above the melting point for the non-foaming resin (e.g. 120° C.) to fluidized resin; and is secondary increased up to the temperature at which gas blow out of the foaming agent (e.g. 140° C.).

Furthermore, examples of non-foaming resins which are mixed with the foaming resins described above include, for example, urea resin, melamine resin, phenol resin, polystyrene resin, epoxy resin, polyvinyl chloride resin, or mixtures thereof.

In the wood board in accordance with the present invention, the surface layers 2 which are laminated to the core layer 1 comprise oriented strand boards in which thin wooden strips which are arranged in a specified direction are adhered and made integral using a binder. The binder which is employed in these surface layers 2 may be a single foaming resin such as those described above, or may comprise a mixture of a foaming resin and a non-foaming resin, or may comprise a non-foaming binder comprising a single non-foaming resin. The composition of a binder which is employed may be selected in consideration of the strength, specific gravity, or water resistance of the wood board which is desired. However, from the point of view of releasability from the mold used in molding, it is preferable that a non-foaming binder be primarily employed.

It is preferable that the amount of binder which is applied to the thin wooden strips comprising the core layer and the surface layers of the wood board in accordance with the present invention be within a range of 5–15 weight percent. If the amount of binder is less than 5 weight percent, the moisture resistance of the wood board declines, while when the amount of binder is in excess of 15 weight percent, the effect of an increase in moisture resistance is not furthered, and the density of the board increases, and the impression of wood is lost. In addition, from the point of view of the strength, if the amount of binder is less than 5 weight percent, the strength of the wood board will decline, while when the amount of binder is in excess of 15 weight percent, there is no further increase in strength, and the density increases and the impression of wood is lost.

Next, thin strips of Japanese red pine, larch, silver fir, fir, aspen, lodgepole pine, or the like, are preferably employed as the thin wooden strips forming the core layer 1 and the surface layers 2 of the wood board of the present invention; however, the type of tree is not particularly restricted.

The core layer 1 of the wood board in accordance with the present invention comprises a strand board in which thin wooden strips are adhered and integrally molded using the foaming binder described above. This core layer 1 may comprise a strand board in which the thin wooden strips are randomly arranged, or may comprise an oriented strand board in which the thin wooden strips are arranged in a single direction. It is preferable that the direction of arrangement of the thin wooden strips in such an oriented strand board be perpendicular to the direction of arrangement of the thin wooden strips comprising the surface layers 2 described hereinbelow; however, this is not necessarily so limited, and this direction may be freely selected.

It is preferable that the average value of the length of the thin wooden strips comprising this core layer 1 be within a range of 40–90 mm, and more preferably within a range of 50–75 mm, and the average value of the width thereof should preferably be within a range of 6–120 mm, and more preferably within a range of 6–50 mm. Furthermore, the thickness thereof is preferably approximately 0.1–0.8 mm. If the average value of the length of the thin wooden strips is less than 40 mm, the flexural strength of the wood board declines, and such a board is particularly unsuitable for use in flooring material. Furthermore, if the average value of the length exceeds 90 mm, it becomes difficult to continue the grain over the entirety of core layer 1, and as a result, the increase in flexural strength commensurate with the length is not evident.

Furthermore, the thickness of the core layer 1 is normally approximately 5 mm–13 mm; however, this is not particularly restricted. The density of the core layer 1 should preferably be set within a range of 0.40–0.75 g/cm$^3$. If the density is less than 0.40 g/cm$^3$, the strength of the board is insufficient, while when the density exceeds 0.75 g/cm$^3$, the weight of the wood board as a whole increases, and it becomes difficult to handle.

It is preferable that the flexural Young's modulus of this core layer 1 be within a range of 35–80×10$^2$ MPa. If the flexural Young's modulus is less than 35×10$^2$ MPa, the deflection when a wood board is formed is in excess of a stipulated value. If the flexural Young's modulus exceeds 80×10$^2$ MPa, the resilience necessary for walking is not achieved.

It is preferable that the surface layers 2, which are laminated to at least one surface of the core layer 1 described above, comprise oriented strand boards comprising thin wooden strips, at least one of the average values of the length and width thereof being greater than that of the thin wooden strips comprising the core layer 1. It is not necessary that all the individual thin wooden strips comprising the surface layers 2 have lengths or widths which are greater than those of the thin wooden strips comprising core layer 1; however, the average value of the length or the width of the thin wooden strips comprising the surface layers 2 should be greater than the average value of the thin wooden strips comprising core layer 1.

In surface layers 2, the thin wooden strips are arranged in essentially a single direction, and these are adhered using a binder, and are integrally molded. It is preferable that the direction of arrangement of the thin wooden strips forming these surface layers 2 be parallel to the longitudinal direction of the wood board; however, this is not necessarily so restricted.

The thin wooden strips comprising the surface layers 2 preferably have an average value of the length thereof which is within a range of 40–120 mm, and more preferably within a range of 50–100 mm, and the average value of the width thereof is preferably within a range of 6–120 mm, and more preferably within a range of 6–100 mm. The length of thin wooden strips for the surface layer 2 is set longer than the length of thin wooden strips for the core layer 1 to make wood board rigid. When the average value of the length of the thin wooden strips is less than 50 mm, the flexural strength of the wood board declines and such a board is inappropriate for use as flooring material, and the surface smoothness thereof is poor. When the average value of the length is in excess of 120 mm, the effect of an increase in surface smoothness in accordance with the length becomes difficult to attain. Furthermore, the thickness of these thin wooden strips is preferably within a range of 0.1–0.8 mm, and in particular, when the thickness is set to a level of 0.3 mm or less, the surface smoothness of the wood board which is obtained is further improved, so that such a thickness is preferable. In the present invention, an integrated strand board for floor element is defined to be smooth: a depression appeared on the surface thereof is 2.0 mm or less in diameter and 0.3 mm or less in depth. The reason is as follows: A decorative board is pressed with binder on the strand board to improve surface appearance. The decorative board is thin enough to be plastic deformation (e.g. 0.3–0.5 mm). Hence, depressions appeared on the strand board is filled with the deformed decorative board. The integrated floor board, covered with the decorative board, becomes free of visible depression.

The density of the surface layers 2 should preferably be within a range of 0.40–0.75 g/cm$^3$. If the density is less than 0.40 g/cm$^3$, the strength of the wood board is insufficient, while when the density is greater than 0.75 g/cm$^3$, the weight of the wood board as a whole increases, and such a board becomes difficult to use. Furthermore, it is preferable that the flexural Young's modulus of the surface layers 2 be within a range of 35–80×10$^2$ MPa.

It is preferable that the thin wooden strips forming the surface layers 2 be acetylated in advance. When the thin wooden strips are acetylated, it is preferable that after desiccating the thin wooden strips so as to attain a water content of 3% or less, and more preferably 1% or less, the thin wooden strips be brought into contact with a vapor of acetic acid, acetic anhydride, chloroacetic acid, or the like, and acetylation thus be carried out in a vapor phase (an acetylation degree of 12–20%).

In this way, by acetylating at least the thin wooden strips comprising the surface layers, it is possible to improve the resistance to insects, resistance to rot, bacterial resistance, and dimensional stability of the wood board and the flooring material.

Next, the manufacturing method for the wood board in accordance with the present invention will be discussed briefly, using as an example a wood board comprising a core layer 1 comprising one strand board such as that shown in FIG. 1, and two surface layers laminated on both surfaces thereof.

In the present invention, it is preferable that the thin wooden strips forming the core layer 1, to which binder was applied, and the thin wooden strips forming surface layer 2, to which binder was applied, be subjected to dry forming, and that the surface layers 2 and the core layer 1 thus be subjected to simultaneous thermal compression molding. However, this is not necessarily so limited, so that it is, for example, acceptable to first separately manufacture a strand board forming core 1 and oriented strand boards forming surface layers 2, and then to apply adhesive to the lamination surfaces and to laminate these boards. Adhesives which are employable for this purpose include, in addition to the foaming or non-foaming binder described above, adhesives which were conventionally used in the bonding of lumber, such as vinyl adhesives, acrylic adhesives, rubber adhesives, or the like.

In the case in which simultaneous thermal compression molding is employed, for example, first, the thin wooden strips forming one surface layer 2, to which binder has been applied, are dispersed on a thermal compression plate so that the direction of grains thereof is essentially identical, and next, the thin wooden strips forming core layer 1, to which a foaming binder has been applied, are dispersed so that the direction of grains thereof is perpendicular to that of the thin wooden strips forming surface layer 2. Furthermore, the thin wooden strips forming the other surface layer 2, to which binder has been applied, are dispersed in such a manner as to be aligned in a direction parallel to the direction of alignment of the thin wooden strips forming the surface layer 2 which were initially dispersed, and thus a three-layer laminated structure is formed.

Next, thermal compression is applied to this three-layer laminated structure in a thermal compression molder, and the structure is thus subjected to simultaneous thermal compression molding. The thermal compression conditions thereof are preferably such that the pressure is within a range of 1–2 MPa, the temperature is within a range of 150°–200° C., and the time is within a range of from the desired thickness (mm)×5–120 seconds.

The planar dimensions of the wood board which is obtained in this manner can be freely selected; however, the thickness thereof is normally with a range of 5 mm–20 mm. Furthermore, the density thereof is preferably within a range of 0.35–0.75 g/cm$^3$, and more preferably within a range of 0.40–0.65 g/cm$^3$. If the density is less than 0.35 g/cm$^3$, the strength of the board will be insufficient, while when the density is greater than 0.65 g/cm$^3$, the overall weight will increase and the board will become difficult to handle. Furthermore, the flexural Young's modulus of this wood board should preferably be within a range of 35–80×10$^2$ MPa, and more preferably within a range of 40–80×10$^2$ MPa. When the flexural Young's modulus is less than 35×10$^2$ MPa, the deflection when the wood board is produced is extremely large, and when the flexural Young's modulus exceeds 80×10$^2$ MPa, when such a board is employed for example as a flooring material, the necessary resiliency for walking cannot be achieved.

In the wood board in accordance with the present invention, surface layers 2 comprising oriented strand boards are laminated to at least one surface of a core layer 1 comprising either a strand board or an oriented strand board. In the explanation given above, a three-layer structure wood board was described in which two oriented strand boards comprising surfaces layers 2 were laminated to the surfaces of a core layer 1 comprising one strand board or oriented strand board; however, the present invention is not necessarily so limited. For example, it is possible to produce a wood board comprising a core layer in which two or more oriented strand boards are laminated, and surface layers laminated to at least one of the surfaces thereof.

Commonly, in oriented strand boards, because the thin wooden strips are oriented in a specified direction, anisotropy is present in the strength thereof. Accordingly, in the case in which an oriented strand board or a laminated structure of oriented strand boards is employed as the core layer, it is possible to design the capabilities of the wood board in accordance with the use thereof by adjusting the direction of orientation of the thin wooden strips comprising the oriented strand board of the core layer.

For example, in cases in which flexural strength in the longitudinal direction is particularly required, because the board is to be used in the form of long planks, it is preferable that the number of layers of oriented strand boards of the core layer be set to an odd number, the direction of orientation of the middle layer be set to the longitudinal direction, and the adjacent layers be laminated in such a manner that the direction of orientation thereof is perpendicular thereto, and that surface layers be laminated to both surfaces of the laminated structure so that the direction of orientation thereof is the longitudinal direction. When this is done, the number of layers in which the thin wooden strips are aligned in the longitudinal direction of the wood board is always greater by one than the number of layers which are aligned in a perpendicular direction. Accordingly, it is possible to increase the strength, for example, the flexural strength, in the longitudinal direction of the wood board.

Furthermore, even if the number of laminated layers is made constant, it is possible to adjust the anisotropy of the strength, for example, the flexural strength, of the wood board even by appropriately adjusting the ratio of the thicknesses of the surface layers and the (laminated) core layer. For example, if the thickness of the wood board as a whole is maintained at a constant level, and the ratio of the thicknesses of both surface layers and the core layer is fixed at a standard level of (surface layer):(core layer):(surface layer)=1:1:1, and the thickness ratio of the surface layers is slowly reduced, the strength in the direction of orientation of the surface layers, which is initially large, gradually decreases, and eventually, strength which is uniform in all directions is attained, and a wood board can be obtained in which the strength in that direction is smaller than the strength in a perpendicular direction.

Accordingly, in the wood board in accordance with the present invention, if the directions of orientation of adjacent layers are made perpendicular, for example, even if the total number of layers of the core layer and the surface layers are set to an even number, or the number of layers is set to an odd number, by means of adjusting the thickness ratio or the like, it is possible to uniformly increase the tensile strength and the flexural strength with respect to all directions in the plane of the wood board.

In this way, a wood board in which the anisotropy of the strength is adjusted by means of the number of laminated layers or by means of the thickness ratio between the surface layers and the core layer, is included in the scope of the present invention.

As described above, in the wood board in accordance with the present invention, at least the surface layers comprise oriented strand boards, and the thin wooden strips thereof are oriented essentially in a single direction, so that it is possible to increase the flexural strength thereof, particularly in the direction of orientation. Furthermore, at least the core layer is integrally molded using a foaming binder in which foaming resin and non-foaming resin are mixed at a predetermined proportions, so that the amount of resin used is reduced, the density of the wood board obtained is reduced, the foamed binder itself contains very small air bubbles, so that the board is softened, and a shock absorbing function is present with respect to external force, so that such a board is difficult to break. Accordingly, the wood board which is obtained has a low density, has a high strength, and has a superior resistance to moisture. In addition, in the wood board in accordance with the present invention, if a non-foaming binder is employed in the surface layers, the releasability from the mold used for molding is increased, and the manufacturing efficiency can be increased.

Furthermore, if the length or the width of the thin wooden strips forming the surface layer is larger than that of the thin wooden strips forming the core layer, wood boards having superior surface smoothness, and having increased strength and rigidity, can be obtained.

In addition, it is possible to adjust the anisotropy of the strength of the wood board by means of adjusting the number of laminated layers or the ratio of the thicknesses of the surface layers and the core layer. The greater the number of laminated layers, the greater the uniformity of the strength in the surface directions, and furthermore, the strength is increased, and the board possesses stability with respect to bending, warping, and twisting.

Next, an explanation will be made with respect to the flooring material in accordance with the present invention.

Figure 2:
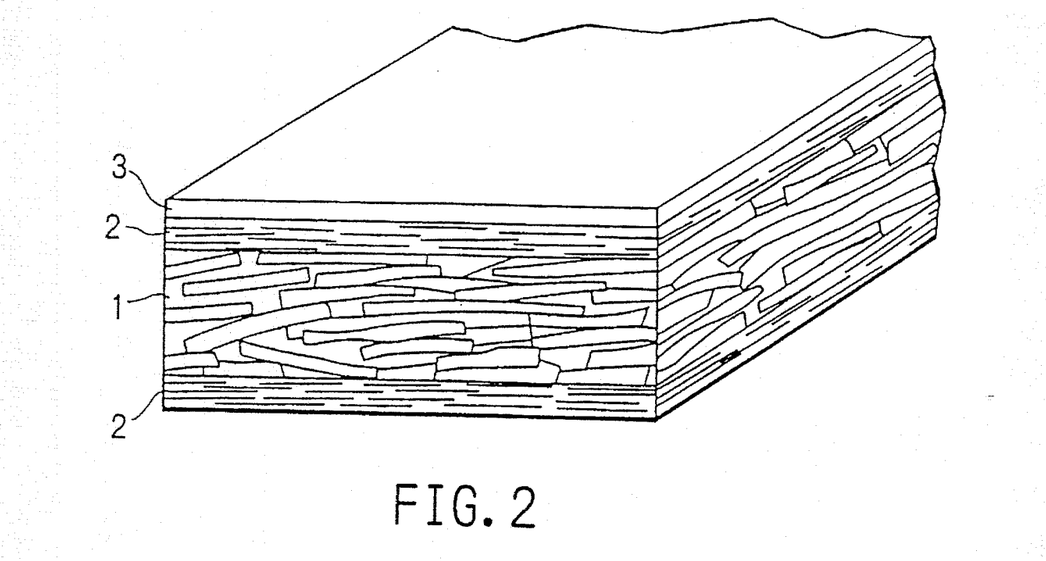
FIG. 2 is a perspective view showing an example of a flooring material in accordance with the present invention.

As shown for example in FIG. 2, in the case in which surface layers 2 are provided on both surfaces of core layer 1 in the wood board in accordance with the present invention described above, a separately prepared decorative single sheet 3 is applied using adhesive to at least one surface of the surface layers 2, and the flooring material of the present invention is thus obtained. Furthermore, in the case in which a surface layer is provided on only one surface of the core layer, a decorative single sheet which is separately prepared is applied, using adhesive, to this surface layer, and the flooring material in accordance with the present invention is obtained. At this time, the surface of the surface layer may be sanded by means of a conventional method, and the decorative single sheet may be affixed to this sanded surface. Furthermore, in the case in which the grain of the wood board can be seen through the decorative single sheet, a non-transparent foundation material may be interposed between the wood board and the decorative single sheet.

The decorative single sheet which is employed herein is not particularly limited; it is possible to use a decorative single sheet having a thickness within a range of 0.2–1.0 mm which was conventionally employed, such as an oak sheet or the like, and in particular, since the surface of the wood board of the present invention is smooth and flat, the surface of the flooring material is smooth even if a thin decorative single sheet is employed.

Furthermore, a urethane coating having a thickness within a range of 40–60 μm, or the like, may be applied to the surface of this decorative single sheet.

A decorative wood board having a decorative single sheet applied to one surface thereof, such as the flooring material shown in FIG. 2, has a wood board, which serves as a base material, which possesses symmetry from the center thereof in the direction of thickness, so that there are cases in which such boards are affected by environmental changes in temperature, humidity, or the like, and bending, warping, or twisting are produced. However, if the layered structure of the laminated wood board serving as the base material is made non-symmetrical in the direction of thickness thereof, this can be prevented. Concretely, such non-symmetry can be produced by methods such as, for example, altering the thickness or the material of both surface layers, or forming a plurality of grooves in the surface to which a decorative single sheet is not applied (the rear surface), which grooves extend in a direction perpendicular to the direction of orientation of the surface.

The flooring material in accordance with the present invention may be cut to a square shape, rectangular shape, or the like, having desired dimensions, or where necessary, may be subjected to other processes such as beveling or finish painting, or male and female connecting members may be formed in the side ends thereof. At this time, in the case in which floor boards having a square block shape or a comparatively wide width are formed, it is preferable that wood boards be used as base materials which have uniform strength in all directions of the surface thereof and which possess little anisotropy, and furthermore, in the case in which long and narrow flooring material is to be formed, it is preferable that wood boards be used as the base material which have particularly increased strength in the longitudinal direction thereof. In the case of any of the above-described floor boards, floor boards possessing the appropriate amount of resiliency for walking may be obtained by adjusting the flexural Young's modulus to within a range of approximately $40$–$80 \times 10^2$ MPa.

The wood board of the present invention may be particularly appropriately used as a floor board; however, it is of course the case that such boards can be applied to a broad range of fields in addition to floor boards, including structural surface material and decorative surface material in buildings, house fittings, furniture, appliances, business machine fittings, toys, and the like.

EXAMPLES

Next, the wood board and the flooring material in accordance with the present invention will be concretely explained based on examples.

Example 1

Thin wooden strips having an average length value within a range of 50–75 mm, an average width value within a range of 6–50 mm, and a thickness within a range of 0.1–0.8 mm are produced for use as the thin wooden strips comprising the core layer by means of a shaving machine (produced by Iwakura Gumi Co., Ltd. ). Using 7 parts per weight of a mixture of foaming urethane resin (produced by Sumitomo Bayer Urethane Co., clude MDI) and unconcentrated urea resin in a weight proportion of 2:1, 100 parts per weight of the thin wooden strips described above are placed in a rotating drum rotating at low speed, and the mixture described above is applied to these thin wooden strips as they tumble within the drum by means of a spray, and thereby the foaming binder is applied to the thin wooden strips of the core layer.

Thin wooden strips having an average length value within a range of 50–100 mm, an average width value within a range of 6–100 mm, and a thickness within a range of 0.1–0.8 mm are produced for use in the thin wooden strip laminated boards comprising the surface layers by means of a shaving machine (produced by Iwakura Gumi Co., Ltd.). Using 10 parts per weight of an aqueous phenol binder, 100 parts per weight of the thin wooden strips described above are placed in a rotating drum rotating at low speed, and the binder described above is applied by means of a spray as the thin wooden strips tumble within the drum, and thus the binder is applied to the thin wooden strips of the surface layers.

First, half of the thin wooden strips of the surface layer to which binder is applied are dispersed on a thermal compression plate so as to be arranged in essentially a single direction, and on this, the thin wooden strips of the core layer to which the foaming binder is applied are dispersed so that the direction of orientation thereof is perpendicular to the direction of orientation of the thin wooden strips comprising the surface layer. Furthermore, on top of this, the remainder of the thin wooden strips of the surface layer are dispersed so as to be arranged in the same direction of orientation as the thin wooden strips of the surface layer which are initially dispersed, and thus a layered body having a thickness of 150 mm is produced. This layered body is subjected to simultaneous thermal compression molding at a temperature of 210° C. at a pressure of 2 MPa, and for a period of 4 minutes, so as to attain a thickness of 12 mm. The surfaces of the wood board which is molded in this manner are smooth.

The density, flexural strength, and flexural Young's modulus of the wood board which is produced in this manner are measured. With respect to the flexural strength, an evaluation is conducted based on Japanese Industrial Standard (JIS-A 5908). As a result, it is determined that the density of the board is 0.58 g/cm$^3$, the flexural strength is 59 MPa, and the flexural Young's modulus is 65×10$^2$ MPa.

Measurements are made in an identical manner with respect to plywood having a thickness which is identical to that of the wood board of Example 1 which is measured as described above. As a result, it is determined that the density is 0.56 g/cm$^3$, the flexural strength is 49 MPa, and the flexural Young's modulus is 52×10$^2$ MPa.

From these results, it is determined that the wood board in accordance with the present invention possessed density which is essentially identical to that of plywood, and possessed a flexural strength which is superior to that of plywood.

Example 2

A decorative single sheet comprising an oak sheet having a thickness of 0.3 mm was attached to one surface of the wood board produced in Example 1, using an aqueous polymeric isocyanate adhesive (produced by Kouyou Sangyo, KR7800), while applying a pressure of 1.0 MPa at a temperature of 110° C. for a period of 3 minutes. The surface of the wood board is smooth, so that the decorative single sheet adhered satisfactorily. Furthermore, after the surface was polished, a urethane coating having a thickness of approximately 50 μm is applied, and thus a flooring material is obtained. The external appearance of the flooring material obtained is smooth and favorable.

The deflection of the flooring material produced in this manner is evaluated based on the Japanese Agricultural Standard (JAS). That is to say, a sample flooring material having dimensions of 300 mm (width) by 1800 mm (length) by 12 mm (thickness) is supported on a span of 700 mm, a load of 21 kg is placed on a load bar placed at the center of the span and perpendicular thereto, and the deflection (A) at this time, the deflection (B) when a load of 9 kg is similarly placed on the bar, and the difference therebetween (A−B), are evaluated. The smaller this difference, the greater the indicated rigidity. It is stipulated in the JAS standards for flooring materials that this deflection have a value of 3.5 mm or less.

When the evaluation described above is executed with respect to the flooring material of Example 2, it is determined that the deflection had a value of 2.3 mm. Accordingly, the flooring material in accordance with the present invention satisfies the JAS standards for deflection, and thus possesses sufficient rigidity for use as flooring material.

Example 3

Thin strips of aspen having a length within a range of 50–75 mm, a width within a range of 6–50 mm, and a thickness within a range of 0.1–0.8 mm are produced by means of a shaving machine (produced by Iwakura Gumi Co., Ltd.).

20 parts per weight of each of 5 types of binder mixtures, in which the weight ratio of a foaming urethane resin (44V20, produced by Sumitomo Bayer Corporation) and a non-foaming aqueous emulsion-type phenol resin is, respectively, 0:100, 25:75, 50:50, 75:25, and 100:0, are prepared. Next, 100 parts per weight of the thin wooden strips described above are placed in a rotating drum rotating at low speed, and the 5 types of binder mixtures described above are applied to the thin wooden strips by means of a spray as the thin wooden strips tumble within the drum.

First, the thin wooden strips to which the 5 types of binder mixtures are applied are dispersed on a thermal compression plate so as to form a layered body having a (surface layer)/(core layer)/(surface layer) structure, and this is subjected to simultaneous thermal compression molding at a temperature of 160° C., a pressure of 2 MPa, and for a period of 20 minutes to produce 5 types of wood boards.

Figure 3:
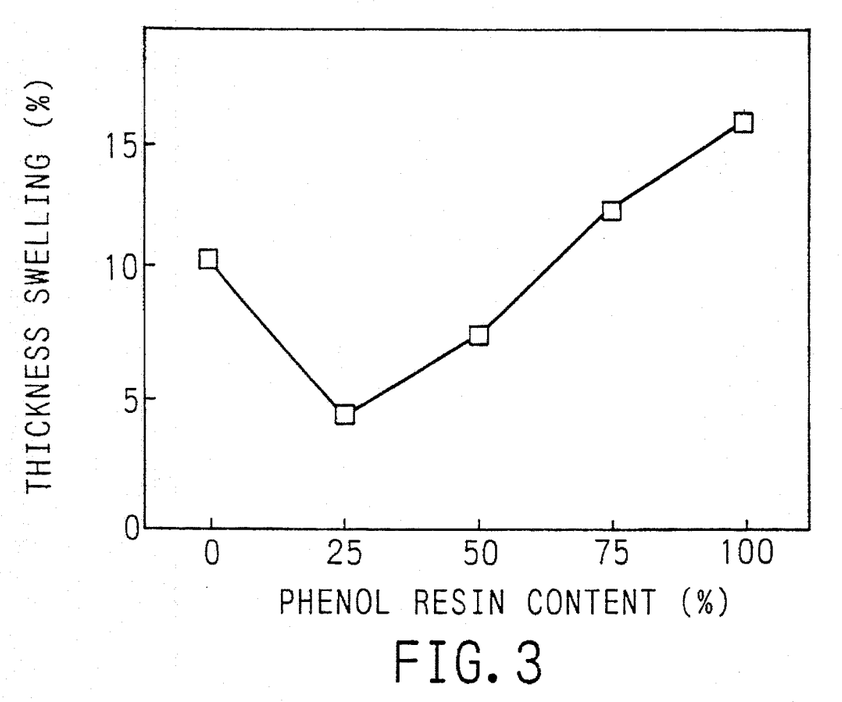
FIG. 3 is a graph showing the relationship between the composition of the binder and the thickness swelling of the wood board obtained using this binder.

The thickness swelling of the wood boards which are thus produced is measured based on the JAS "Structural Panels" standards. What is meant by the "thickness swelling" is the increase in thickness of the board after immersion for a period of 72 hours in water, expressed as a percentage with respect to the thickness prior to immersion. The results thereof are shown in FIG. 3. In the FIG. 3, the horizontal axis indicates the percentage of phenol resin contained in the binder mixture. A peak is exhibited at a point at which the percentage of non-foaming resin present in the binder mixture is approximately 25%, and in cases in which this percentage is greater or lesser than this amount, the thickness swelling increases, that is to say, there is a tendency for the water resistance to decline.

Example 4

Thin strips of aspen having a length within a range of 50–75 mm, a width within a range of 6–50 mm, and a thickness within a range of 0.1–0.8 mm are produced by means of a shaving machine (produced by Iwakura Gumi Co., Ltd.). A binder comprising a mixture in a ratio of 2:1 of foaming urethane resin (44V20, produced by Sumitomo Bayer Corporation) and a non-foaming aqueous emulsion type phenol resin is prepared, 100 parts per weight of the thin wooden strips described above are placed in a rotating drum rotating at low speed, and the binder is applied to the thin wooden strips for use in the surface layer by means of a spray applied to the thin wooden strips as they tumble within the drum. At this time, the amount of binder applied is varied within a range of 3–18 weight percent.

The thin wooden strips to which the binder is applied are dispersed on a thermal compression plate so as to form a laminated body having a (surface layer)/(core layer)/(surface layer) structure, and this is subjected to simultaneous thermal compression molding for a period of 20 minutes at a temperature of 160° C. at a pressure of 2 MPa so as to form a thickness of 12 mm, and thus, 6 types of wood boards having differing amounts of binder are produced.

Figure 4:
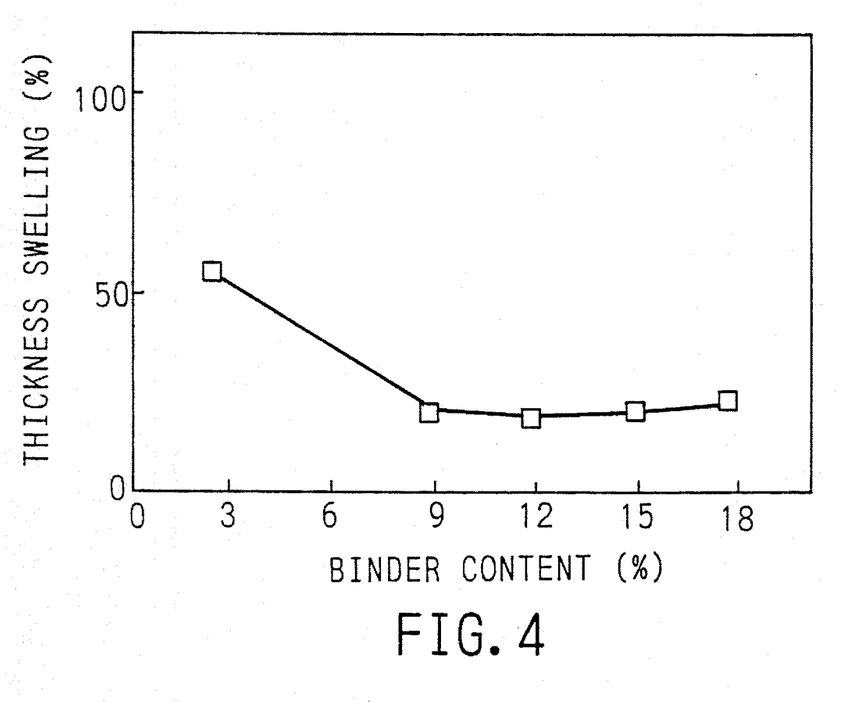
FIG. 4 is a graph showing the relationship between the amount of binder contained and the thickness swelling of the wood board obtained using this binder.

The thickness swelling of these 6 types of wood boards is measured. The results are shown in FIG. 4. Within the measured ranges, as the amount of binder is increased, the thickness swelling also increased, and the resistance to moisture is improved. However, when the amount of binder contained exceeded approximately 12%, even if the amount of binder is further increased, this value shows almost no improvement.

Example 5

Thin strips of aspen having a length within a range of 50–75 mm, and a width within a range of 6–50 mm, are produced for use as a material for the oriented strand board forming the core layer by means of a shaving machine (produced by Iwakura Gumi Co., Ltd. ).

12 parts per weight of a binder comprising a mixture, at a weight ratio of 2:1, of foaming urethane resin (44V20, produced by Sumitomo Bayer Corporation) and a non-foaming aqueous emulsion type phenol resin is prepared, 88 parts per weight of the thin wooden strips described above are placed in a rotating drum rotating at low speed, the binder is applied to the thin wooden strips for use in the surface layer by means of a spray applied to the thin wooden strips as they tumble within the drum, and thus the binder is applied to the thin wooden strips for use in the core layer.

Thin aspen strips having a length within a range of 50–100 mm and a width within a range of 6–100 mm are produced by means of a shaving machine (produced by Iwakura Gumi Co., Ltd.) for use as the material for the oriented strand boards comprising the surface layers. 12 parts per weight of a foaming binder comprising a mixture, at a weight ratio of 2:1, of foaming urethane resin (44V20, produced by Sumitomo Bayer Corporation) and a non-foaming aqueous emulsion-type phenol resin are prepared. 88 parts per weight of the thin wooden strips described above are placed in a rotating drum rotating at low speed, the binder is applied by means of a spray to the thin wooden strips as they tumble within the drum, and thus the binder is applied to the thin wooden strips for use in the surface layers.

First, half of the thin wooden strips for use in the surface layer to which a binder is applied are dispersed on a thermal compression plate so as to be arranged in essentially a single direction, and on top of this, the thin wooden strips for use in the core layer to which a binder is applied are dispersed so that the direction of orientation thereof is perpendicular to the direction of orientation of the thin wooden strips for use in the surface layer. Furthermore, on top of this, the remainder of the thin wooden strips for use in the surface layer are dispersed so as to be oriented in the same direction as the direction of orientation of the thin wooden strips for use in the surface layer which are initially dispersed, and thus a three-layered laminated body is formed. This laminated body is subjected to simultaneous thermal compression molding for a period of 20 minutes at a temperature of 160° C. and at a pressure of 2 MPa. The thickness of the wood board obtained is 12 mm and the density thereof is 0.61 g/cm$^3$.

Example 6

The thickness swelling of the wood board in accordance with the present invention which is produced in Example 5 is measured based on the JIS standards. In the JIS standards, the period in which the board is immersed in water is 24 hours, while 72 hours in JAS standards. Furthermore, a normal peel strength test and a boiling peel strength test were conducted based on the JAS standards. The results thereof are shown in Table 1. In Table 1, when peeling is not observed as a result of the boiling peel strength test, this is shown by a o, and when partial peeling is observed, this is indicated by a Δ.

Comparative Example 1

Measurements identical to those of Example 6 are conducted with respect to plywood (a standard water-resistant type) having a thickness identical to that of wood board of Example 5. The results thereof are shown in Table 1.

Comparative Example 2

Measurements identical to those of Example 6 are conducted with respect to plywood (a completely water-resistant type) having a thickness identical to that of wood board of Example 5. The results thereof are shown in Table 1.

Comparative Example 3

Measurements identical to those of Example 6 are conducted with respect to an oriented strand board which has a thickness which is identical to that of the wood board of Example 5 and which is obtained in a conventional manner by the integral molding of thin wooden strips using 2 weight percent of a non-foaming binder. The results thereof are shown in Table 1.

TABLE 1

|  | EXAMPLE 6 | COMPARATIVE EXAMPLE 1 | COMPARATIVE EXAMPLE 2 | COMPARATIVE EXAMPLE 3 |
| --- | --- | --- | --- | --- |
| THICKNESS SWELLING (%) | 2.55 | 3.16 | 3.61 | 7.20 |
| NORMAL PEEL STRENGTH (kg WEIGHT) | 15.2 | 6.4 | 6.4 | 5.3 |
| BOILING PEEL STRENGTH | o | o | Δ | o |

Example 7

The wood board in accordance with the present invention which is produced in Example 5, the plywood of Comparative Example 1, and the oriented strand board of Comparative Example 3 are immersed for a period of 72 hours in water, the weight increase ratio thereof is measured based on the JAS Standards, and thus the resistance to moisture is evaluated. The results are shown as weight per gain (WPG) after immersion with respect to the weight prior to immersion. The results are shown in Table 2.

TABLE 2

|  | EXAMPLE 5 | COMPARATIVE EXAMPLE 1 | COMPARATIVE EXAMPLE 3 |
| --- | --- | --- | --- |
| WEIGHT PER GAIN (%) | 7.77 | 18.56 | 38.46 |

Example 8

With respect to the wood board in accordance with the present invention which is manufactured in Example 5, the plywoods and the oriented strand board of Comparative Examples 1 through 3, the bis holding power in the planar direction and cross sectional (grain) directions thereof are measured based on the JIS Standards. The results are shown in Table 3.

TABLE 3

|  | EXAMPLE 3 | COMPARATIVE EXAMPLE 1 | COMPARATIVE EXAMPLE 2 | COMPARATIVE EXAMPLE 3 |
| --- | --- | --- | --- | --- |
| PLANAR | 76 kg WEIGHT | 49 kg WEIGHT | 44 kg WEIGHT | 53 kg WEIGHT |
| GRAIN | 48 kg WEIGHT | 51 kg WEIGHT | 34 kg WEIGHT | 21 kg WEIGHT |

It can be seen from these results that the wood board in accordance with the present invention possesses resistance to moisture which is superior to that of conventional plywood and possesses bis holding power which is equal to or greater than that of conventional plywoods or oriented strand boards.

Example 9

The deflection value of the wood board in accordance with the present invention produced in Example 5 is measured based on the JAS Standards. For example, it is necessary that the deflection of flooring material be equal to or less than 3.5 mm, in accordance with the JAS Standards for flooring materials.

As a result, it is determined that the deflection of the wood board in accordance with Example 5 was 3.0 mm, and that this satisfies the JAS Standards for flooring material.

Example 10

Five types of wood boards, in which the composition of the binder varied, are produced in the same manner as in Example 3.

Figure 5:
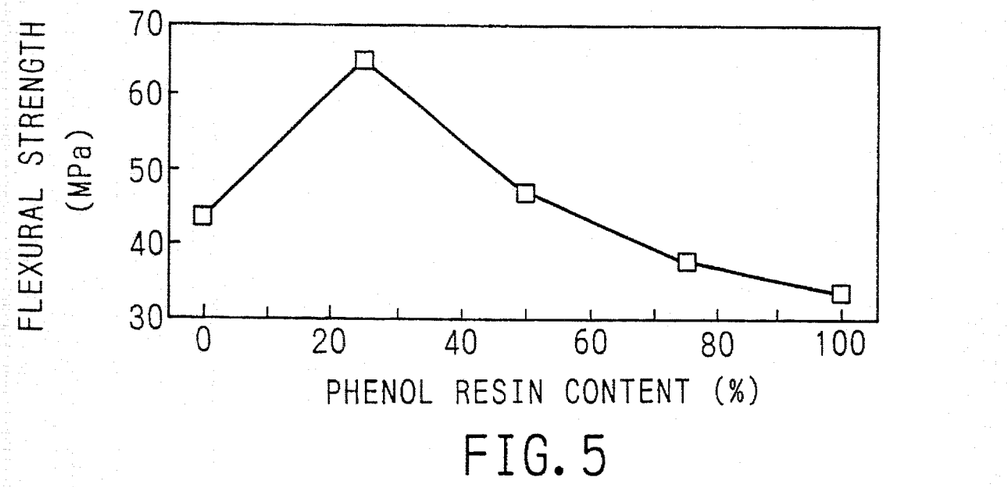
FIG. 5 is a graph showing the relationship between the composition of the binder and the flexural strength of the wood board obtained using this binder.

The flexural strength of each of these wood boards which are produced is measured based on the JIS Standards. The results thereof are shown in FIG. 5. In the FIG. 5, the horizontal axis indicates the percentage of phenol resin contained in the binder mixture. A peak is present at a ratio of non-foaming resin contained in the binder mixture of 25%, and in cases in which this ratio is greater or smaller, there is a tendency for the flexural strength to decline. In particular, when the percentage of non-foaming resin contained is less than 25%, the flexural strength becomes less than 35 MPa.

Example 11

Six types of wood boards having varying binder amounts are produced in the same manner as in Example 4.

Figure 6:
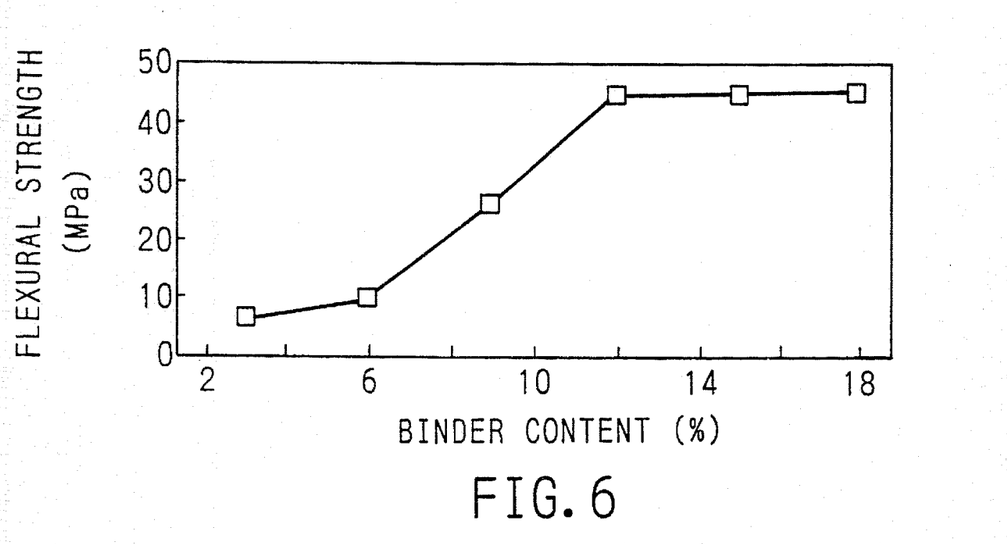
FIG. 6 is a graph showing the relationship between the amount of binder contained and the flexural strength of the wood board obtained using this binder.

The flexural strength of these 6 types of wood boards are measured. The results are shown in FIG. 6. Within the measured range, a tendency is observed for the flexural strength to increase as the amount of binder increased. However, when the amount of binder contained exceeded 12%, the value of the flexural strength remained essentially unimproved even when the amount of binder is increased.

Example 12

The flexural strength and flexural Young's modulus of the wood board in accordance with the present invention which is produced in Example 5 are measured. With respect to flexural strength, the evaluation is conducted on the basis of JIS-A5908. The results thereof are shown in Table 4.

Comparative Example 4

Measurements identical to those conducted in Example 12 are conducted with respect to plywood (density 0.58 g/cm$^3$) having the same thickness as that of wood board of Example 5. The results thereof are shown in Table 4.

Comparative Example 5

Measurements which are identical to those of Example 12 are conducted with respect to an conventional oriented strand board in which thin wooden strips were integrally molded using 2 weight percent of a non-foaming binder, and which had a thickness identical to that of the wood board of Example 5. The results thereof are shown in Table 4.

Comparative Example 6

A medium density fiber board (having a density of 0.70 g/cm$^3$) having a thickness identical to that of the wood board of Example 5 is measured in a manner identical to that of Example 12. The results thereof are shown in Table 4.

TABLE 4

|  | EXAMPLE 4 | COMPARATIVE EXAMPLE 1 | COMPARATIVE EXAMPLE 2 | COMPARATIVE EXAMPLE 3 |
| --- | --- | --- | --- | --- |
| FLEXURAL STRENGTH (MPa) | 58 | 46 | 43 | 42 |
| FLEXURAL YOUNG'S MODULUS (MPa) | $64 \times 10^2$ | $54 \times 10^2$ | $56 \times 10^2$ | $35 \times 10^2$ |

From these results, it can be seen that the wood board in accordance with the present invention possesses flexural strength which is superior to that of conventional plywood, oriented strand boards, or fiber boards.

Example 13

A process is followed which is identical to that of Example 5, with the exceptions that the foaming binder used to form the oriented strand board comprising the core layer is made a mixture, at a 1:1 ratio, of a water soluble phenol resin, comprising the non-foaming resin, and a urethane resin (44V20, produced by Sumitomo Bayer Co., Ltd.), comprising the binder, and a wood board having a three-layered structure and a thickness of 12 mm was produced.

Example 14

With respect to the wood boards in accordance with the present invention which are produced in Examples 5 and 13, and the plywood, oriented strand board, and fiber board produced in Comparative Examples 4–6, the bis holding power in the planar direction and the cross sectional (grain) direction are measured based on the JIS Standards. The results thereof are shown in Table 5.

TABLE 5

|  | EXAMPLE 5 | EXAMPLE 13 | COMPARATIVE EXAMPLE 4 | COMPARATIVE EXAMPLE 5 | COMPARATIVE EXAMPLE 6 |
| --- | --- | --- | --- | --- | --- |
| PLANAR | 53 kg WEIGHT | 56 kg WEIGHT | 44 kg WEIGHT | 53 kg WEIGHT | 46 kg WEIGHT |
| GRAIN | 36 kg WEIGHT | 35 kg WEIGHT | 34 kg WEIGHT | 21 kg WEIGHT | 32 kg WEIGHT |

From these results, it is clear that the wood board in accordance with the present invention possesses a bis holding power which is equal to or greater than that of the conventional board materials.

Example 15

The deflection of the wood board of the present invention which is produced in Example 13 is measured based on the JAS Standard. For example, it is necessary that the deflection value be 3.5 mm or less in order to conform to the JAS Standard for flooring material.

As a result, it is determined that the deflection of the wood board of Example 13 is 3.3 mm, and this is thus in conformity with the JAS Flooring Material Standard.

Example 16

Figure 7:
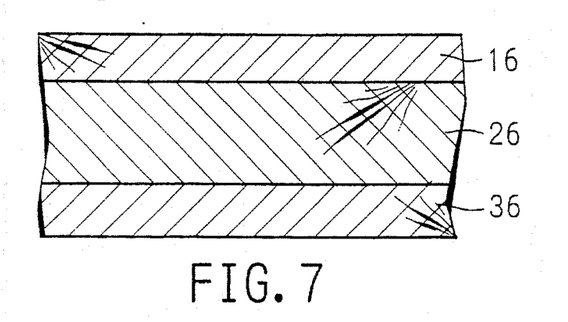
FIG. 7 is a cross sectional view showing the wood board of Example 16.

In FIG. 7, a wood board in accordance with Example 16 is shown. In this wood board, 3 oriented strand boards 16, 26, and 36 are laminated so that the direction of orientation of adjacent layers is mutually perpendicular. The thickness of this wood board is 12 mm; the thickness of the oriented strand boards 16 and 36 forming the surface layers is 3 mm each, and the thickness of the oriented strand board 26 forming the core layer is 6 mm. That is to say, the thickness ratio of (surface layer):(core layer):(surface layer) was 1:2:1.

This laminated wood board is produced as described below.

Using a shaving machine, thin wooden strips having a length within a range of 30–50 mm, a width within a range of 2–20 mm, and a thickness within a range of 0.15–0.20 mm are produced from silver fir lumber.

100 parts per weight of these thin wooden strips are placed in a rotating drum rotating at low speed, and 20 parts per weight of an aqueous phenol resin binder is applied to the thin wooden strips in the form of a spray as the thin wooden strips tumble within the rotating drum, and the phenol resin binder is thus applied uniformly to the thin wooden strips, and a mixture 1 of thin wooden strips and binder is thus obtained.

Using a shaving machine, thin wooden strips having a length within a range of 75–80 mm, a width within a range of 5–50 mm, and an average thickness of 0.55 mm are obtained from silver fir lumber.

100 parts per weight of the thin wooden strips described above are placed in a rotating drum rotating at low speed, and 20 parts per weight of a mixture, at a weight ratio of 2:1, of foaming urethane resin (the clude MDI produced by Sumitomo Bayer Urethane Corporation) and non-concentrated urea resin, is applied in the form of a spray to the thin wooden strips as the thin wooden strips tumble within the rotating drum, and thus the foaming binder is applied uniformly to the thin wooden strips, and a mixture 2 of thin wooden strips and binder is obtained.

The Mixture 1 is dispersed on a thermal compression plate so that the direction of orientation of the thin wooden strips were arranged in essentially a single direction, and this is layered so as to achieve a thickness of 62 mm.

The Mixture 2 as dispersed in a continuous manner on top of this so that the direction of orientation of the thin wooden strips thereof is essentially perpendicular to that of the previous Mixture 1, and this is layered so as to achieve a thickness of 126 mm.

Furthermore, the Mixture 1 is dispersed in a continuous manner on top of this so that the direction of orientation of the thin wooden strips thereof is essentially perpendicular to that of the Mixture 2 which is previously layered, and this is layered so as to achieve a thickness of 62 mm.

The three-layer layered material which is thus obtained is subjected to thermal compression molding for a period of 20 minutes at a temperature of 160° C. and at a pressure of 2 MPa, and the wood board in accordance with Example 16 is obtained.

The laminated material which is thus obtained is subjected to thermal compression for a period of 20 minutes at a temperature of 160° C. and at a pressure of 2 MPa, and the wood board of Example 18 is thus obtained.

Figure 8:
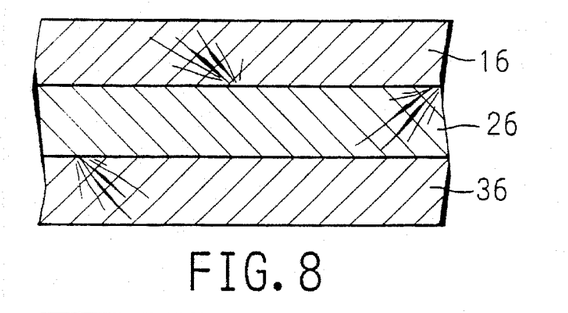
FIG. 8 is a cross sectional view showing the wood board of Example 17.
Figure 9:
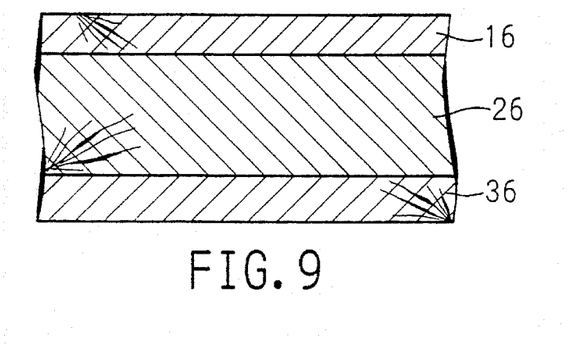
FIG. 9 is a cross sectional view showing the wood board of Example 18.

Using the direction of orientation of each of the surface layers of the wood boards of Examples 16, 17, and 18 as the X-direction, and the direction perpendicular to this as the Y-direction, the flexural strength and the flexural Young's modulus in each of these directions is measured. The results thereof are shown in Table 6.

TABLE 6

| EXAMPLES (THICKNESS RATIO) | AXIS | FLEXURAL STRENGTH (MPa) | FLEXURAL YOUNG'S MODULUS (MPa) |
| --- | --- | --- | --- |
| EXAMPLE 16 | X | 43.3 | $50.5 \times 10^2$ |
| (1:2:1) | Y | 30.1 | $28.0 \times 10^2$ |
| EXAMPLE 17 | X | 45.9 | $52.8 \times 10^2$ |
| (1:1:1) | Y | 28.1 | $25.0 \times 10^2$ |
| EXAMPLE 18 | X | 40.7 | $43.3 \times 10^2$ |
| (1:3:1) | Y | 33.7 | $33.0 \times 10^2$ |

Example 17

In FIG. 8, a wood board in accordance with Example 17 is shown. In this wood board, as in Example 16, three oriented strand boards are laminated so that the direction of orientation of adjacent layers is mutually perpendicular, and a thickness of 12 mm is obtained. However, the thickness of the oriented strand boards 16 and 36 comprising the surface layers and the oriented strand board 26 comprising the core layer is 4 mm in each case. That is to say, the thickness ratio (surface layer):(core layer):(surface layer) was 1:1:1.

This laminated wood board is manufactured in a manner identical to that of Example 16.

However, the Mixture 1 is layered so as to achieve a thickness of 83 mm, and on top of this, the Mixture 2 is continuously layered so as to achieve a thickness of 83 mm, and furthermore, on top of this, the Mixture 1 is continuously layered so as to achieve a thickness of 83 mm.

The laminated material obtained is subjected to thermal compression molding for a period of 20 minutes at a temperature of 160° C. and at a pressure of 2 MPa, and the wood board in accordance with Example 17 is obtained.

Example 18

In FIG. 9, the wood board in accordance with Example 18 is shown. In this wood board, as in Example 16, three oriented strand boards are laminated so that the direction of orientation of adjacent layers is mutually perpendicular, and a thickness of 12 mm is achieved. However, the thickness of the oriented strand boards 16 and 36 comprising the surface layers is 2.4 mm in each case, and the thickness of the oriented strand board 26 comprising the core layer is 7.2 mm. That is to say, the thickness ratio (surface layer):(core layer):(surface layer) is 1:3:1.

This laminated wood board is produced in a manner identical to that of Example 16.

However, Mixture 1 is layered so as to achieve a thickness of 50 mm, and on top of this, Mixture 2 is continuously layered so as to achieve a thickness of 150 mm, and on top of this, Mixture 1 is continuously layered so as to achieve a thickness of 50 mm.

It can be seen from the results of Table 6 that when the wood board of Example 16 (thickness ratio 1:2:1) is used as a standard, in the case of Example 17 (thickness ratio 1:1:1), in which the thickness ratio of surface layers 16 and 36 is large even though the total thicknesses of the boards are identical, the flexural strength in the X-direction, which is the direction of orientation of the surface layers, is clearly larger than that of Example 16, while in the case of Example 18 (thickness ratio 1:3:1), the thickness ratio of the surface layers 16 and 36 is comparatively small, so that the flexural strength in the X-direction is smaller than that of Example 16, and the anisotropy thereof is thus reduced.

Example 19

One surface layer 16 of the wood board of Example 16 is sanded, and an oak decorative single sheet having a thickness of 0.2 mm is applied to this surface, and a flooring material is thus produced. The surface layer and the decorative single sheet are adhered using an aqueous polymeric isocyanate adhesive (Kouyou Sangyou Corporation, KR7800), and applying a pressure of 10 MPa for a period of 3 minutes at a temperature of 110° C. The surface of this decorative single sheet is further polished, and a urethane coating having a thickness of approximately 50 μm is applied thereto.

The flooring material obtained is smooth and has an attractive surface, and the surface hardness thereof is high, so that such a flooring material possesses favorable properties for use as a floor board.

Example 20

The flooring material of Example 19 is cut into a rectangular shape such that the length in the X-direction was 1800 mm and the length in the Y-direction was 300 mm, and in the rear surface thereof, 3 grooves having a width of 3 mm and a depth of 2 mm are formed at intervals of 450 mm in a direction perpendicular to the direction of orientation of the flooring material, and the layered structure of the flooring material is thus made non-symmetrical in the direction of thickness thereof.

The deflection of this floor board is evaluated based on the JAS Standards. This floor board is in accordance with these Standards.

Example 21

Figure 10:
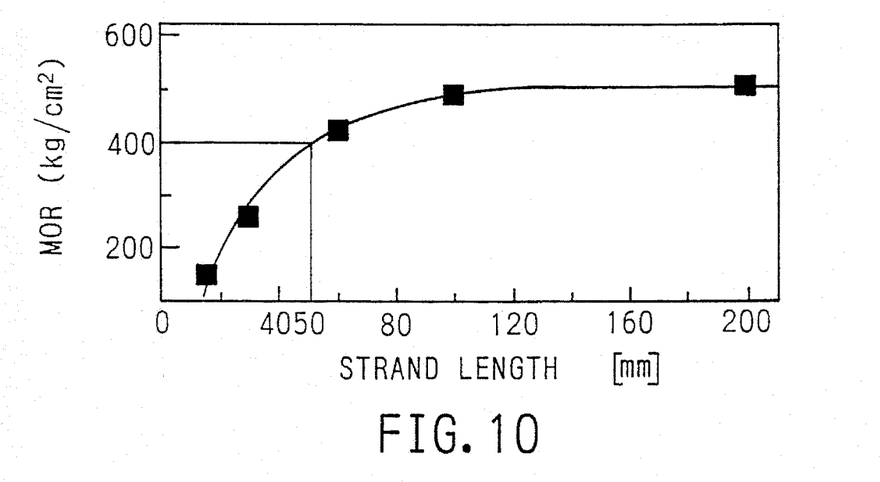
FIG. 10 is a graph showing the relationship between the length of the thin wooden strips and the flexural strength.

A modulus of rupture of wooden strand boards are measured with respect to strand length of constituent wooden strand. FIG. 10 shows the result of the measurement. In this measurement, 5–12 parts per weight of resin, consisting of foaming resin and non-foaming resin, is dispersed to 100 parts per weight of wooden strand. Each dot in FIG. 10 shows a mean value of sample value of resin content having 5–12 parts per weight.

It is seen from FIG. 10 that length of strand becomes 120 mm or longer, modulus of rupture is constant at about 470 force/cm$^2$. When length of strand becomes shorter than 100 mm, modulus of rupture gradually becomes smaller. When strand length becomes shorter than 50 mm, modulus of rupture becomes smaller than 400 force/cm$^2$. 400 force/cm$^2$ is the critical value for use as flooring material. When modulus of rupture is smaller than about 400 force/cm$^2$, a flooring board does not bear weight of ordinary adult, thereby the board is deformed or crack is generated therein. Therefore, it is preferable to use wooden strand having 50 mm length or more to utilized as flooring material.

Wooden strand is deformed and curls during manufacturing process when length of wooden strand becomes longer than 120 mm because of ununiformity of tissue of wood and variation of moisture content. Such deformation causes ununiform distribution of binder and deteriorate mechanical strength of wood board. Therefore, it is preferable to use strand of 120 mm length or less.

As a result, length of wood strand preferably set to be 50–120 mm.

Although the invention has been described in detail herein with reference to its preferred embodiments and certain described alternatives, it is to be understood that this description is by way of example only, and it is not to be construed in a limiting sense. It is further understood that numerous changes in the details of the embodiments of the invention, and additional embodiments of the invention, will be apparent to, and may be made by persons of ordinary skill in the art having reference to this description. It is contemplated that all such changes and additional embodiments are within the spirit and true scope of the invention as claimed below.

What is claimed is:

1. A wood board, comprising:
    (a) a core layer comprising at least one wood strand board in which wooden strips are adhered and integrally molded with a foaming binder, and
    (b) at least one surface layer comprising wood oriented strand board in which wooden strips are adhered and integrally molded using a binder, and which is laminated to at least one surface of said core layer,
    wherein said foaming binder comprises a mixture of foaming resin and non-foaming resin at a ratio within a range of 4:1–1:4, and
    wherein an amount of resin contained in said foaming binder is within a range of 5–15 weight percent with respect to a total weight of said foaming binder and said wooden strips constituting said core layer.

2. A wood board according to claim 1, wherein said surface layer comprises wood oriented strand board in which wooden strips are adhered and integrally molded using a non-foaming binder.

3. A wood board according to claim 2, wherein an amount of resin contained in said non-foaming binder is within a range of 5–15 weight percent with respect to a total weight of said non-foaming binder and said wooden strips constituting said surface layers.

4. A wood board according to claim 1, wherein said foaming resin comprises a foaming urethane resin, and said non-foaming resin comprises a phenol resin.

5. A wood board, comprising:
    (a) a core layer comprising at least one wood strand board in which wooden strips are adhered and integrally molded with a foaming binder, and
    (b) at least one surface layer comprising wood oriented strand board in which wooden strips are adhered and integrally molded using a binder, and which is laminated to at least one surface of said core layer,
    wherein said wooden strips constituting said surface layers have at least one of an average length value thereof and an average width value thereof which is greater than that of said wooden strips constituting said core layer,
    wherein said foaming binder comprises a mixture of foaming resin and non-foaming resin at a ratio within a range of 4:1–1:4, and
    wherein an amount of resin contained in said foaming binder is within a range of 5–15 weight percent with respect to a total weight of said foaming binder and said wooden strips constituting said core layer.

6. A wood board according to claim 5, wherein an average value of a length of said wooden strips constituting said surface layers is within a range of 40–120 mm, and an average value of a width thereof is within a range of 6–120 mm.

7. A wood board according to claim 5, wherein an average value of a length of said wooden strips constituting said core layer is within a range of 40–90 mm, and an average value of a width thereof is within a range of 6–120 mm.

8. A wood board, comprising:
    (a) a core layer comprising at least one wood strand board in which wooden strips are adhered and integrally molding with a foaming binder, and
    (b) two surface layers comprising wood oriented strand boards in which wooden strips are adhered and integrally molded using a binder, and which are laminated to both surfaces of said core layer,
    wherein a direction of orientation of wooden strips in neighboring oriented strand board is mutually perpendicular,
    wherein said foaming binder comprises a mixture of foaming resin and non-foaming resin at a ratio within a range of 4:1–1:4, and
    wherein an amount of resin contained in said foaming binder is within a range of 5–15 weight percent with respect to a total weight of said foaming binder and said wooden strips constituting said core layer.

9. A wood board according to claim 8, wherein a number of oriented strand boards constituting said core layer is an odd number, and by means of altering a thickness ratio of said surface layers and said core layer, a strength in a direction of orientation of wooden strips constituting said surface layers is increased.

10. A wood board according to claim 8, wherein a sum of a thickness of said surface layers is greater than a thickness of said core layer, and a strength in a direction of orientation of said wooden strips constituting said surface layers is increased.

11. A wood board according to claim 1 wherein said core layer and said surface layer are simultaneously molded.

12. A wood board according to claim 1 wherein said wooden strips comprising said surface layer are subjected to acetylation treatment.

13. A wood board according to claim 1 wherein a density of said wood board is within a range of 0.40–0.75 g/cm$^3$, and a flexural Young's modulus of said wood board is within a range of 35–80×10$^2$ MPa.

14. A flooring material comprising a wood board according to claim 1 and a decorative single sheet laminated to at least one surface of surface layer of said wood board.

15. A flooring material according to claim 14, wherein a layered structure of said wood board is made non-symmetrical in a direction of thickness thereof.

16. A flooring material according to claim 15, wherein a plurality of grooves are formed in a surface of a side opposite to a surface on which said decorative single sheet is laminated.

17. A wood board according to claim 5, wherein said core layer and said surface layer are simultaneously molded.

18. A wood board according to claim 5, wherein said wooden strips comprising said surface layer are subjected to acetylation treatment.

19. A wood board according to claim 5, wherein a density of said wood board is within a range of 0.40–0.75 g/cm$^3$, and a flexural Young's module of said wood board is within a range of 35–80×10$^2$ MPa.

20. A flooring material comprising a wood board according to claim 5 and a decorative single sheet laminated to at least one surface of surface layer of said wood board.

21. A flooring material according to claim 20, wherein a layered structure of said wood board is made non-symmetrical in a direction of thickness thereof.

22. A flooring material according to claim 21, wherein a plurality of grooves are formed in a surface of a side opposite to a surface on which said decorative single sheet is laminated.

23. A wood board according to claim 8, wherein said core layer and said surface layer are simultaneously molded.

24. A wood board according to claim 8, wherein said wooden strips comprising said surface layer are subjected to acetylation treatment.

25. A wood board according to claim 8, wherein a density of said wood board is within a range of 0.40–0.75 g/cm$^3$, and a flexural Young's module of said wood board is within a range of 35–80×10$^2$ MPa.

26. A flooring material comprising a wood board according to claim 8 and a decorative single sheet laminated to at least one surface of surface layer of said wood board.

27. A flooring material according to claim 26, wherein a layered structure of said wood board is made non-symmetrical in a direction of thickness thereof.

28. A flooring material according to claim 27, wherein a plurality of grooves are formed in a surface of a side opposite to a surface on which said decorative single sheet is laminated.

29. A wood board according to claim 1, wherein at least one of the average values of the length and width of the wooden strips comprising the surface layer is greater than the average value of the corresponding dimension of the wooden strips comprising the core layer.

* * * * *